T. SHARP.
Plow.
No. 18,355.
Patented Oct. 6, 1857.
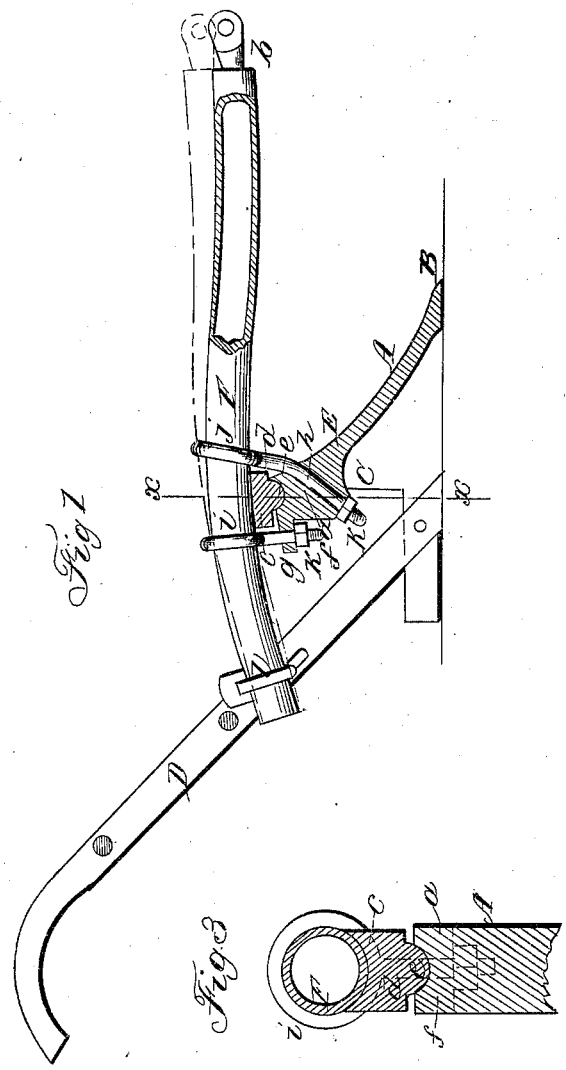
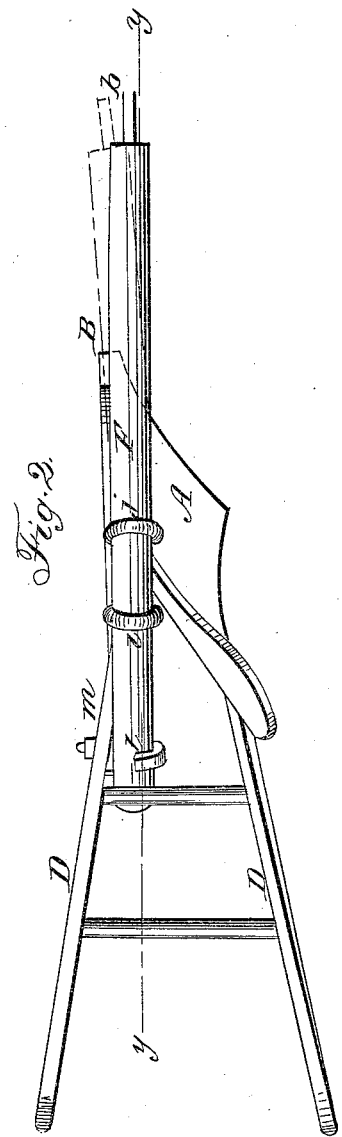

UNITED STATES PATENT OFFICE.

THOMAS SHARP, OF NASHVILLE, TENNESSEE.

IMPROVEMENT IN PLOWS.

Specification forming part of Letters Patent No. 18,355, dated October 6, 1857.

*To all whom it may concern:*

Be it known that I, THOMAS SHARP, of Nashville, in the county of Davidson and State of Tennessee, have invented a new and useful Improvement in Plows; and I do hereby declare that the following is a full, clear, and exact description of the same, reference being had to the annexed drawings, making a part of this specification, in which—

Figure 1 is a longitudinal vertical section of my improvement, taken in the line $yy$, Fig. 2. Fig. 2 is a plan or top view of same. Fig. 3 is a transverse vertical section of the beam and mold-board, taken in the line $xx$, Fig. 1.

Similar letters of reference indicate corresponding parts in the several figures.

This invention consists in the peculiar means employed for regulating or adjusting the line of draft of a plow relatively with its share, whereby the depth of the furrow as well as the width may be regulated with far greater nicety than by the usual clevis.

To enable those skilled in the art to fully understand and construct my invention, I will proceed to describe it.

A represents the mold-board, B the share, and C the landside, of a plow. D D are the handles. E is the standard.

The landside, mold-board, share, and standard may be cast all in one piece, or they may be cast separately and connected by screw-bolts.

The parts above referred to are constructed in the usual way, with the exception of the standard E, the upper end of which is cast quite thick, or with a protuberance, $a$, and is not, as is usual, connected directly with the plow-beam. (See Fig. 1.)

F is the beam, which is constructed of an iron tube, bent or curved quite similar to the ordinary wooden beams, as shown clearly in Fig. 1. The beam has an eye, $b$, secured in its outer end, to which the draft-chain, whiffle-tree, or splinter-bar is secured. The beam rests in a concave, $c$, in the upper surface of a metal block, $d$, on the under surface of which a semi-sphere, $e$, is formed. The semi-sphere $e$ is fitted in a corresponding-shaped recess, $f$, made in the upper surface of the standard. (See Figs. 1 and 3.) Through the upper part of the standard E two bolts, $g\,h$, pass, said bolts having eyes or rings $i\,j$ on their upper ends, through which the beam F passes, and the beam is secured firmly upon the block $d$, and the semi-spherical portion $e$ of said block is secured firmly in the recess $f$ by screwing up the nuts $k$ of said bolts $g\,h$. (See Fig. 1.) The back end of the beam F rests in a loop or hook, $l$, which is attached to one of the handles D, said loop or hook having its shank pass through a slot in the handle, and having a nut, $m$, on its outer end. The loop or hook consequently may be adjusted higher or lower, as desired.

From the above description of parts it will be seen that the outer end of the beam F may be raised or depressed by adjusting the bolts $g\,h$ and hook or loop $l$, and it will also be seen that the beam F may be turned within the eye or rings $i\,j$ and hook or loop $l$, and when turned it will be seen that the eye $b$ will be thrown more or less out of line with the point of the share B.

The vertical adjustment of the end of the beam is shown in red in Fig. 1, and the lateral adjustment is shown in red in Fig. 2. The crooked or curved form of the beam is the cause of the eye $b$ being thrown out of line laterally with the share B as the beam is turned, and consequently as the line of draft may be thrown at either side of the point of the share, and at a greater or less distance from it, the share will have a greater or less tendency to press or move toward the landside, or, technically speaking, more or less "land" may be given the p'ow, and the width of the furrow regulated as desired. By the vertical adjustment of the beam a greater or less tendency is given the share to enter the soil, and consequently the depth of the furrow may be regulated as desired.

By the above improvement the line of draft may be regulated or adjusted relatively with the share both vertically and laterally with the greatest nicety, far more so than by the usual clevis.

I do not claim a hollow or tubular iron beam, for they have been previously used, but, so far as I am aware, for lightness and strength only, without reference to any particular mode of attaching the beam to the plow with a view to the adjustment of draft with the share.

What I claim, therefore, as new, and desire to secure by Letters Patent, is—

Attaching the beam F to the plow substantially as shown, or in any equivalent way which will admit of the turning of the beam for the purpose of adjusting the draft hook or eye $b$ both laterally and vertically, as set forth.

THOS. SHARP.

Witnesses:
J. T. HAMILTON,
A. W. PUTNAM.